(No Model.)

J. NEALE.
BELT FASTENER.

No. 309,310. Patented Dec. 16, 1884.

Witnesses:
O. E. Sundgren
Emil Schwartz

Inventor:
James Neale
by his Attys
Brown & Hall

UNITED STATES PATENT OFFICE.

JAMES NEALE, OF BRIDGEPORT, CONNECTICUT.

BELT-FASTENER.

SPECIFICATION forming part of Letters Patent No. 309,310, dated December 16, 1884.

Application filed February 6, 1884. (No model.)

*To all whom it may concern:*

Be it known that I, JAMES NEALE, of Bridgeport, in the county of Fairfield and State of Connecticut, have invented a new and useful Improvement in Belt-Fasteners, of which the following is a specification.

The object of my invention is to provide a very strong metallic belt-fastener which may be manipulated easily to connect and disconnect the ends of a belt or driving-band, but which will not permit the ends of the belt or band to become disconnected when in use.

The invention consists in a belt-fastener composed of a broad flat link or plate having at its ends curved or arc-shaped slots or notches extending transversely from opposite edges, as more fully hereinafter described, for use in connection with rivets or pins inserted through the belt, and capable of being engaged with and disengaged from said rivets or pins by a swinging movement in the direction of its width.

The invention also consists in a belt-fastener of the kind above described for use as above set forth, and having between the curved or arc-shaped slots or notches a key slot or socket adapted to receive a key for swinging said link.

The fastener is applicable to round as well as flat belts, and in the latter class the fasteners may be applied to one side only of the belt or to both sides thereof in pairs.

Figure 1:
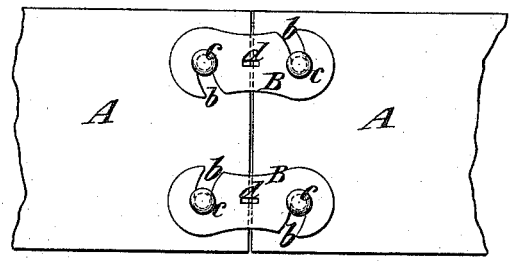
Figure 2:
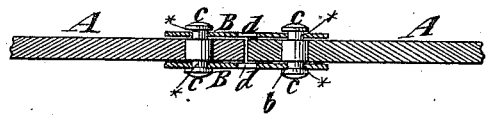
Figure 3:
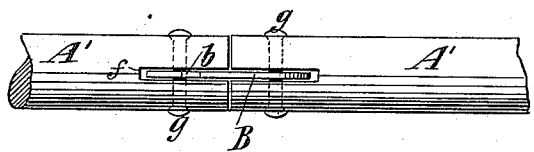

In the accompanying drawings, Figure 1 is a plan of the two end portions of a belt joined by fasteners embodying my invention. Fig. 2 is a sectional view of the portions of the belt and fastener. Fig. 3 is a side view of the two end portions of a round belt joined by a single fastener of the kind shown in Figs. 1 and 2, and Fig. 4 is a partly-sectional view of said round belt on the plane of the fastener.

Similar letters of reference designate corresponding parts in all the figures.

Figure 4:
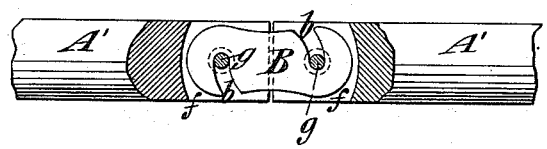

A A designate the end portions of a flat belt or driving-band, and A' A' designate the end portions of the round belt shown in Figs. 3 and 4.

The fasteners B consist of flat links or plates of metal, preferably steel, having considerable width and but very little thickness. In the ends of each link are slots or notches $b$, extending inwardly from opposite edges of the plate transversely to the length of the link or plate. The slots or notches $b$ in each link or plate B are curved or arc-shaped.

In connection with each fastener are employed two rivets or pins, $c$ $c$, which are or may be inserted through the belt portions from the inner sides thereof.

Near the ends of each rivet or pin $c$ are circumferential or annular grooves *, whereby there are formed necks of a size to enter the slots or notches $b$, and heads to overlap the link adjacent to said slots or notches, as best shown in Fig. 2.

The links or fasteners may be applied to both sides of the belt in pairs, or to the outer side only, and in the latter case the rivets or pins $c$ will have a neck or groove, *, near one end and a head near the other end. The two arc-shaped or curved slots or notches $b$ of each link which extend from opposite sides at the two ends, are struck from an imaginary center at the middle of the length of the link, and at the middle of each link is a slot, $d$, which is intended to receive a plain flat key, whereby the link may be turned to engage its slots or notches $b$ with the rivets or pins $c$ or to disengage them from the rivets or pins. The rivets or pins $c$ always tend to the bottom of the slots or notches when a strain is exerted on the belt, and hence the ends will not become disconnected in use. When the belt is relieved of strain, the fasteners or double hooks B may be turned to disengage them from the rivets or pins $c$ by means of a key inserted in the slots $d$.

In the example of my invention shown in Figs. 3 and 4 the end portions, A', of the round belt are slotted at $f$, and ordinary rivets $g$ are inserted transversely through them, as shown. A single fastener or double hook, B, like those shown in Figs. 1 and 2, is received in the slots $f$, and its two arc-shaped or curved slots $b$ engage with the rivets $g$.

The fasteners hereinabove described may be made of steel of any width desired and of very little thickness, and the rivets or pins $c$ may also be of steel.

Not only do my improved fasteners prevent the end portions of the belt from becoming disconnected when in use, but they provide for disconnecting the end portions of the belt, when desired, with little trouble and without mutilating the belt or fasteners.

What I claim as my invention, and desire to secure by Letters Patent, is—

1. The belt-fastener herein described, consisting of a broad flat link or plate having at its ends curved or arc-shaped slots or notches $b$, extending transversely from opposite edges, for use in connection with rivets or pins inserted through the belt, and capable of being engaged with and disengaged from said rivets or pins by a swinging movement in the direction of its width, substantially as herein described.

2. The belt-fastener B, having the arc-shaped or curved slots or notches $b$ and the key slot or socket $d$, substantially as herein described.

JAMES NEALE.

Witnesses:
C. HALL,
JOHN THOMPSON.